US011529021B2

(12) United States Patent
Alexander et al.

(10) Patent No.: US 11,529,021 B2
(45) Date of Patent: Dec. 20, 2022

(54) ACTIVELY HEATED OR COOLED DRINKWARE CONTAINER

(71) Applicant: Ember Technologies, Inc., Westlake Village, CA (US)

(72) Inventors: Clayton Alexander, Westlake Village, CA (US); Mikko Juhani Timperi, San Marcos, CA (US); Daren John Leith, Agoura Hills, CA (US); Christopher Thomas Wakeham, Solana Beach, CA (US); Joseph Lyle Koch, Anaheim, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 297 days.

(21) Appl. No.: 16/962,014

(22) PCT Filed: Jan. 18, 2019

(86) PCT No.: PCT/US2019/014198
§ 371 (c)(1),
(2) Date: Jul. 14, 2020

(87) PCT Pub. No.: WO2019/152219
PCT Pub. Date: Aug. 8, 2019

(65) Prior Publication Data
US 2020/0345180 A1   Nov. 5, 2020

Related U.S. Application Data

(60) Provisional application No. 62/624,677, filed on Jan. 31, 2018.

(51) Int. Cl.
*A47J 41/00* (2006.01)
*A47J 41/02* (2006.01)
(Continued)

(52) U.S. Cl.
CPC ......... *A47J 41/005* (2013.01); *A47J 41/0094* (2013.01); *A47J 41/02* (2013.01);
(Continued)

(58) Field of Classification Search
CPC ............... F25B 21/02; F25B 2321/023; F25B 2321/025; F25B 2303/083;
(Continued)

(56) References Cited

U.S. PATENT DOCUMENTS 2,210,953 A   3/1967  Rait
5,572,872 A   11/1996 Hlavacek
(Continued)

FOREIGN PATENT DOCUMENTS

EP    1188995 A1 *  3/2002  .............. F25B 21/04
ES    2372458 A1    1/2012
(Continued)

OTHER PUBLICATIONS

International Search Report and Written Opinion dated May 22, 2019, received in International Patent Application No. PCT/US2019/014198.
(Continued)

*Primary Examiner* — Joseph F Trpisovsky
(74) *Attorney, Agent, or Firm* — Knobbe, Martens, Olson & Bear LLP

(57) ABSTRACT

A container has a chamber and a phase change material (PCM) that can remove heat from the chamber. The container can have a thermal conductor movably coupled in the container between a retracted position and a deployed position, where in the deployed position, while on a heat sink unit, the thermal conductor can draw heat from the PCM to solidify or charge the PCM, which can then maintain the chamber in a chilled state for a prolonged period of time. The container can have one or more heating elements in
(Continued)

thermal communication with the chamber and operable to add heat to the chamber to increase or maintain a temperature of the chamber in a heated state for a prolonged period of time.

11 Claims, 9 Drawing Sheets

(51) Int. Cl.
    *F25B 21/02*     (2006.01)
    *B65D 81/18*     (2006.01)
    *B65D 81/38*     (2006.01)

(52) U.S. Cl.
    CPC .............. *F25B 21/02* (2013.01); *B65D 81/18* (2013.01); *B65D 81/3841* (2013.01); *F25B 2321/023* (2013.01); *F25B 2321/025* (2013.01)

(58) Field of Classification Search
    CPC .. F25B 2303/0832; A47J 41/005; A47J 41/02; A47J 41/0094; B65D 81/18; B65D 81/3841
    See application file for complete search history.

(56) References Cited

U.S. PATENT DOCUMENTS

| | | |
|---|---|---|
| 7,089,749 B1 | 8/2006 | Schafer |
| 9,581,384 B1 | 2/2017 | Scofield |
| 2009/0049845 A1 | 2/2009 | McStravick |
| 2013/0221013 A1 | 8/2013 | Kolowich et al. |
| 2017/0042373 A1 | 2/2017 | Alexander et al. |
| 2018/0051918 A1 | 2/2018 | Vantubergen, Jr. |

FOREIGN PATENT DOCUMENTS

| | | | | |
|---|---|---|---|---|
| FR | 2609880 A1 * | 1/1987 | | |
| FR | 2759774 A1 | 8/1998 | | |
| FR | 2842289 A1 * | 1/2004 | .............. | F25B 21/04 |
| JP | 2001/201233 A | 7/2001 | | |
| WO | WO 2014/166867 A1 | 10/2014 | | |
| WO | WO 2017/137774 A2 | 8/2017 | | |
| WO | WO 2017/192396 A1 | 11/2017 | | |
| WO | WO 2018/130252 A1 | 7/2018 | | |
| WO | WO 2019/152219 A1 | 8/2019 | | |

OTHER PUBLICATIONS

Invitation to Pay Additional Fees dated Mar. 21, 2019, received in International Patent Application No. PCT/US2019/014198.

* cited by examiner

ACTIVELY HEATED OR COOLED DRINKWARE CONTAINER

BACKGROUND OF THE INVENTION

Field of the Invention

The invention is directed to a container (e.g., cup, mug, tumbler, beer mug, water bottle, liquid container, medicine container or cooler), and more particularly to an actively heated or cooled container.

Description of the Related Art

Reusable drinkware containers (e.g., cups, mugs, travel mugs, water bottles, liquid containers, baby bottles) for holding liquids therein are common and are sometimes made of plastic or metal materials. However, one common drawback of existing drinkware containers is their inability to adjust the temperature of the liquid for consumption (e.g., to cool or heat the liquid) or maintain the liquid in a cooled or heated state for a prolonged period of time. For example, sometimes the liquid that is poured into the drinkware (e.g., coffee, tea, milk, soup) is too hot to drink so that the user must wait a while before trying to consume the liquid or risk burning their mouth if they consume the liquid too soon. However, if the user waits too long to consume the liquid, it may cool down too much so that it is unsatisfying to consume. Additionally, if the user is travelling (e.g., commuting to work) over a long distance, a liquid that is initially cool will continue to warm up and a liquid that is initially warm will continue to cool so that the user cannot enjoy the liquid in the drinkware throughout their travels at a consistent temperature.

SUMMARY

Accordingly, there is a need for improved containers that can actively heat or cool contents (e.g., water, iced tea, coffee, tea, soup, oatmeal, medicine, vaccines, etc.) to a desired temperature for consumption, and that can maintain the contents at the desired temperature or temperature range over an extended period of time (e.g., 48 hours, 24 hours, 12 hours, 6 hours or less, 4 hours or less, 2 hours or less, etc.).

In accordance with one aspect, a drinkware container system is provided. The container system comprises a container body that extends between a proximal end and a bottom wall at a distal end, the container body having an outer wall and an inner wall spaced inward of the outer wall to define a cavity therebetween. The inner wall extends between an opening at a proximal end of the container body and a base wall, the inner wall and base wall defining a chamber configured to receive and hold a liquid, the bottom wall spaced below the base wall. The container system also comprises a phase change material disposed in the cavity and in thermal communication with at least a portion of the chamber, the phase change material spaced apart from the outer wall. The container system also comprises a thermal conductor housed in the cavity and configured to move between a retracted position proximate the base wall where a gap is defined between the thermal conductor and the bottom wall, and a deployed position proximate the bottom wall where the thermal conductor is in thermal communication with the bottom wall. The thermal conductor has one or more walls disposed in thermal communication with the phase change material and between the phase change material and the outer wall.

In one implementation, the drinkware container comprises one or more thermoelectric elements attached to the thermal conductor and having a cold side that faces toward the base wall and a hot side that faces toward the bottom wall, where in the retracted position the hot side is spaced apart from the bottom wall by the gap and in the deployed position the hot side is in thermal communication with the bottom wall.

The container system can in one implementation have a heat sink unit comprising a support surface configured to receive at least a portion of the bottom wall thereon, the heat sink unit having one or both of a fan and one or more fins configured to dissipate heat from the container body when body is disposed adjacent the surface of the heat sink unit.

In one implementation, the heat sink unit further comprises one or more thermoelectric elements having a cold side that faces along a same direction as the support surface of the heat sink unit and a hot side that faces away from the support surface of the heat sink unit.

In accordance with another aspect, a drinkware container system is provided. The system comprises a container body that extends between a proximal end and a bottom wall, the container body having an outer wall and an inner wall spaced inward of the outer wall to define a cavity therebetween, the inner wall extending between an opening at a proximal end of the container body and a base wall, the inner wall and base wall defining a chamber configured to receive and hold a liquid, the bottom wall spaced below the base wall. The system also comprises a phase change material disposed in the cavity and in thermal communication with at least a portion of the chamber, the phase change material spaced apart from the outer wall. The system also comprises one or more heating elements housed in the cavity and in thermal communication with at least a portion of the chamber. The system also comprises a cap attached to the container body and defining a cavity between the bottom wall and a base of the cap, the cap housing one or more power storage elements and control circuitry, the control circuitry configured to control the operation of the one or more heating elements to heat a liquid in the chamber to a preselected temperature setpoint. The phase change material is configured to absorb heat from a heated liquid that is poured into the chamber having a temperature greater than a transition temperature of the phase change material, and wherein the one or more heating elements is configured to add heat to the liquid in the chamber to increase or maintain a temperature of the liquid.

In accordance with another aspect, a drinkware container system is provided. The system includes a container body that extends between a proximal end and a bottom wall, the container body having an outer wall and an inner wall spaced inward of the outer wall to define a cavity therebetween, the inner wall extending between an opening at a proximal end of the container body and a base wall, the inner wall and base wall defining a chamber configured to receive and hold a liquid, the bottom wall spaced below the base wall. The system also comprises a phase change material disposed in the cavity and in thermal communication with at least a portion of the chamber, the phase change material spaced apart from the outer wall. The system also comprises a thermal conductor housed in the cavity and configured to move between a retracted position spaced from the outer wall so that a gap is defined between the thermal conductor and the outer wall, and a deployed position proximate the outer wall where the thermal conductor is in thermal communication with the outer wall, the thermal conductor being in thermal communication with the phase change material and between the phase change material and the outer wall. The system also comprises one or more heating elements housed in the cavity and in thermal communication with at least a portion of the chamber. The system also comprises a cap attached to the container body and defining a cavity between the bottom wall and a base of the cap, the cap housing one or more power storage elements and control circuitry, the control circuitry configured to control the operation of the one or more heating elements to heat a liquid in the chamber to a preselected temperature setpoint.

DETAILED DESCRIPTION

Figure 1:
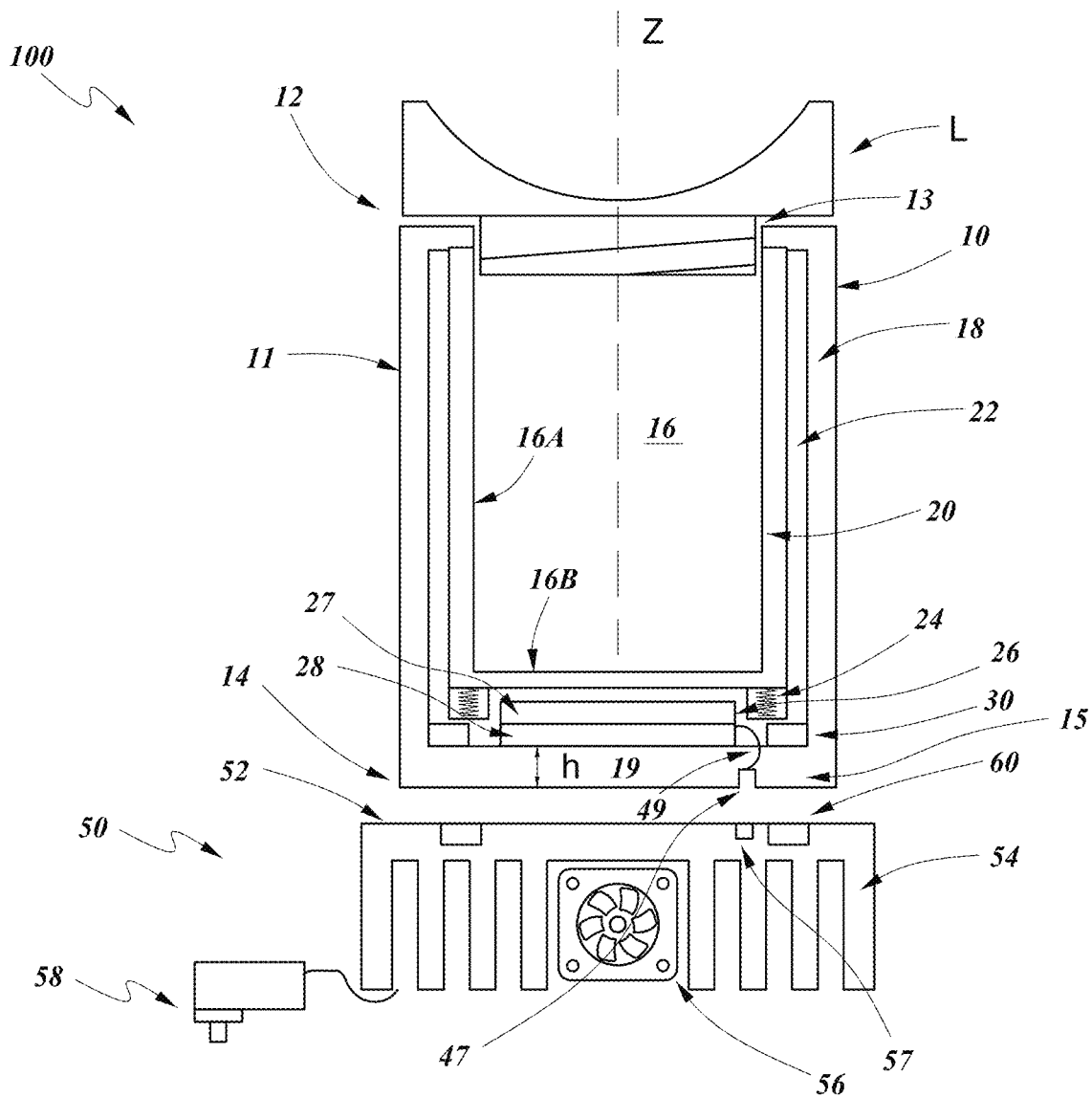
FIG. 1 is a schematic view of an actively cooled drinkware container in one position.
Figure 2:
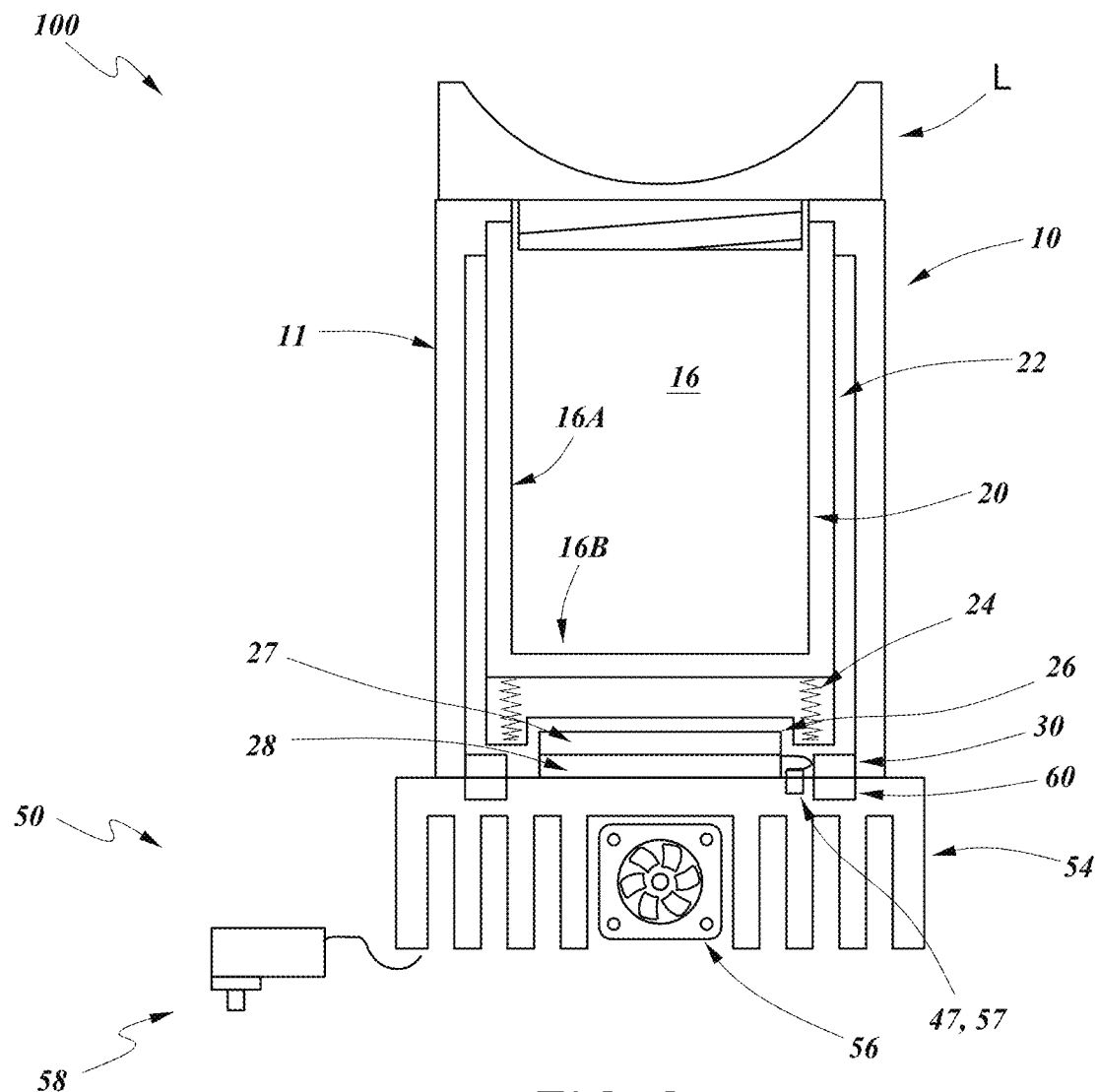
FIG. 2 is a schematic view of the actively cooled drinkware container of FIG. 1 in a different position.

FIGS. 1-2 show a schematic cross-sectional view of a container 100. Optionally, the container 100 is cylindrical and symmetrical about a longitudinal axis Z, and one of ordinary skill in the art will recognize that the features shown in cross-section in FIGS. 1-2 are defined by rotating them about the axis Z to define the feature of the cylindrical container. The container can be a drinkware container (e.g., cup, mug, tumbler, beer mug, water bottle, liquid container) but can be other type of food containers (e.g., lunch box) or medicine container (e.g., medicine cooler for holding/storing medicine, such as vaccines, vials, injector pens, insulin, etc.). Accordingly, disclosure below for features of a drinkware container 100 also apply to such food or medicine containers.

The drinkware container 100 is optionally an actively cooled drinkware container operable to cool the contents of the container and/or maintain the contents of the container in a cooled or chilled state. The drinkware container 100 has a body 10 with an outer wall 11 that extends between a proximal end 12 that has an opening 13 and a distal end 14 having a base 15. The opening 13 is selectively closed by a lid L removably attached to the proximal end 12. The body 10 has an inner wall 16A and a base wall 16B that defines an open chamber 16 that can receive and hold a liquid (e.g., water, iced tea, iced coffee, soft drink, etc.) or container (e.g., medicine vial, vaccine, injector pens) therein. Optionally, the body 10 can be made of metal (e.g., stainless steel). In another implementation, the body 10 can be made of plastic. In one implementation, the body 10 has a cavity 18 (e.g., annular cavity or chamber) between the inner wall 16A and the outer wall 11. Optionally, the cavity 18 can be under vacuum. In another implementation, the cavity 18 can be filled with air but not be under vacuum.

With continued reference to FIGS. 1-2, a phase change material (PCM) 20 (e.g., thermal core) is disposed about the chamber 16. Optionally, the phase changer material 20 is a solid-to-solid PCM. In another implementation, the phase change material 20 is a solid-to-liquid PCM. Optionally, the phase change material 20 is disposed within a chamber circumferentially about the inner wall 16A. Optionally, the phase change material 20 is additionally (or alternatively) disposed within a chamber adjacent the base wall 16B. The phase change material 20 optionally has a low temperature melting point (e.g., melting point less than 10 degrees C., less than 5 degrees C., etc.). For example, the phase change material 20 can have a melting point temperature of approximately 4 degrees Celsius (e.g., approximately 40 degrees Fahrenheit).

A heat spreader 22 is movably disposed about the phase change material (PCM) 20 in thermal communication with the PCM 20. Optionally, the heat spreader 22 can be in direct contact with the chamber in which the PCM 20 is housed. The heat spreader 22 can optionally have a cylindrical shape. In one implementation, the heat spreader 22 is made of metal. As further described below, the heat spreader 22 effects heat transfer with the PCM 20.

With continued reference to FIGS. 1-2, the heat spreader 22 is movably attached about the chamber 16. Optionally, one or more springs 24 (e.g. coil springs) are attached to the heat spreader 22 and the chamber 16 (e.g., to the chamber that houses the PCM 20). In another implementation, the one or more springs 24 are excluded and the heat spreader 22 is instead fixed (i.e., not movably attached) relative to the chamber 16.

The drinkware container body 10 optionally includes (e.g., houses) one or more thermoelectric elements 26 (e.g., Peltier elements) in thermal communication with the heat spreader 22. Optionally, the one or more thermoelectric elements 26 are attached to the heat spreader 22. A cold side 27 of the one or more thermoelectric elements 26 can face toward or contact the heat spreader 22. A hot side 28 of the one or more thermoelectric elements 26 can face away from the heat spreader 22. Optionally, one or more magnets 30 (e.g., permanent magnets) can be attached to or embedded in the heat spreader 22. In another implementation the one or more magnets 30 are excluded; for example, the heat spreader 22 can be made of a magnetic material (e.g., a metal).

With continued reference to FIGS. 1-2, the drinkware container 100 can be removably attached to (e.g., disposed upon, supported on or in contact with) a heat sink unit 50. The heat sink unit 50 can have a proximal surface 52 and one or more (e.g., a plurality of) fins 54. Optionally, the heat sink unit 50 has a fan 56. The heat sink unit 50 can optionally have a connector 58 (e.g., wall outlet connector) for connecting the heat sink unit 50 to a power source. In another implementation, the heat sink unit 50 can instead have one or more batteries (e.g., rechargeable batteries). Optionally, one or more magnets 60 are attached to or embedded in the heat sink unit 50, for example attached to or embedded in the proximal surface 52 of the heat sink unit 50. In one implementation, the one or more magnets 60 are optionally permanent magnets. In another implementation, the one or more magnets 60 are optionally electromagnets whose polarity can be selectively controlled by a controller of the heat sink unit 50 (e.g., via user input via a user interface of the heat sink unit 50 or wirelessly via a mobile electronic device such as a smartphone) to allow selective coupling and decoupling of the drinkware container 100 to the heat sink unit 50.

In implementations where the heat spreader 22 is movably attached about the chamber 16, for example by the one or more springs 24, the heat spreader 22 can move between a retracted position (shown in FIG. 1) and an extended position (shown in FIG. 2). When the heat spreader 22 is in the retracted position (see FIG. 1), the heat spreader 22 is spaced from the base 15 so there is a gap 19 with a height h between the base 15 of the body 10 and the heat spreader 22. When the heat spreader is in the extended position (see FIG. 2), the heat spreader 22 is adjacent the base 15, for example, so that at least a portion of the heat spreader 22 is in adjacent to (e.g., in contact with) the base 15 (e.g., to close the gap 19 completely). In an implementation where the heat spreader 22 is fixed (e.g., not movably attached) relative to the chamber 16, the heat spreader 22 is adjacent the base 15 (as shown in FIG. 2).

With reference to FIG. 2, when the drinkware container 100 is placed on the heat sink unit 50, for example so that the base 15 of the body 10 contacts the proximal surface 52, the one or more magnets 60 of the heat sink unit 50 exert an attraction force on the one or more magnets 30 of the heat spreader 22 that is greater than a spring force exerted by the one or more springs 24 on the heat spreader 22, causing the heat spreader 22 to move in the direction toward the heat sink unit 50 until the heat spreader 22 is proximate (e.g., in contact with) the base 15 (e.g. into the deployed position shown in FIG. 2).

While in the deployed position, power is optionally transmitted from the heat sink unit 50 to the one or more thermoelectric elements 26 to operate the one or more thermoelectric elements 26. The heat sink unit 50 can thus provide a power base for the drinkware container 100. Optionally, one or more electrical contacts 47 of the body 10 (e.g., on a bottom surface of the body 10) can optionally connect with the one or more thermoelectric elements 26. The one or more electrical contacts 47 of the body 10 can contact one or more electrical contacts 57 and in the heat sink unit 50 to thereby transfer power from the heat sink unit 50 to the one or more thermoelectric elements 26. Optionally, the one or more electrical contacts 47 of the body 10 can communicate with the one or more thermoelectric elements 26, for example, via one or more wires 49.

With continued reference to FIG. 2, while in the deployed position, the hot side 28 of the one or more thermoelectric elements 26 are in thermal communication (e.g., in contact with the base 15 of the body 10, which is in thermal communication (e.g., in contact) with the proximal surface 52 of the heat sink unit 50. The one or more thermoelectric elements 26 operate to transfer heat from the cold side 27 to the hot side 28, and the heat from the hot side 28 is removed (or dissipated) by the heat sink unit 50 (e.g., by the one or more fins 54 of the heat sink unit 50). Optionally, the fan 56 is operated to facilitate removal of heat from the hot side 28 via the heat sink unit 50. The cold side 27 of the one or more thermoelectric elements 26 is in thermal communication with the heat spreader 22, which is in thermal communication with the PCM 20. Therefore, operation of the one or more thermoelectric elements 26 (e.g., while the lid L is on the container body 10) causes their cold side 27 to cool the heat spreader 22, which in turn cools the PCM 20 (to solidify or charge the PCM 20). Optionally, the PCM 20 can be cooled in this manner so as to solidify the PCM 20.

Removal of the drinkware container 100 from the heat sink unit (e.g., power base) 50, allows the spring force of the one or more springs 24 to retract the heat spreader 22 away from the base 15 (e.g., to define the gap 19 between the base 15 and the heat spreader 22). In implementations where the chamber 18 is under vacuum, retraction of the heat spreader to the retracted position (e.g., see FIG. 1) facilitates the insulation of the PCM 20 (e.g., thermal core) from the outer surface 11 and base 15 of the body 10 to inhibit loss of the PCM 20 charge through these surfaces. In other implementations, where the chamber 18 is not under vacuum, retraction of the heat spreader 22 would still facilitate insulation of the PCM 20, though not as efficiently as the implementation where the chamber 18 is under vacuum. Once the PCM 20 is charged (e.g., solidified), a liquid (e.g., water, juice, soft drink, iced tea) can be introduced into the chamber 16 and the PCM 20 can maintain the liquid in the chamber 16 a cooled state for a prolonged period of time (e.g., 10 hours or less, 8 hours or less, 6 hours or less, 4 hours or less, 2 hours or less, about 1 hour, etc.).

In another implementation, the heat spreader 22 is in a fixed position in thermal communication with the base 15 (e.g., so the gap 19 is closed) when the drinkware container 100 is disposed on the heat sink unit 50 as well as when it is removed from the heat sink unit 50.

Figure 3:
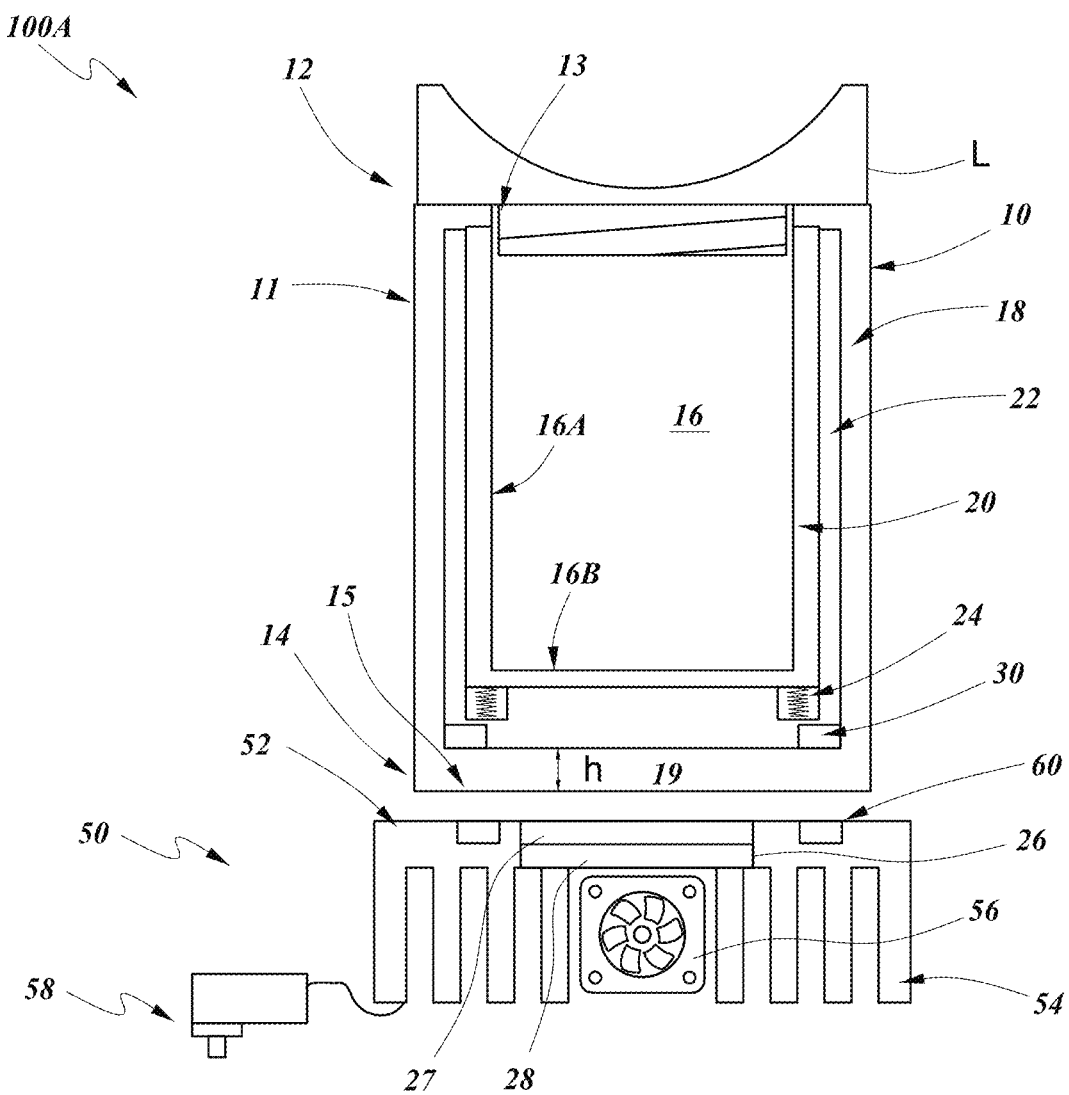
FIG. 3 is a schematic view of an actively cooled drinkware container in one position.
Figure 4:
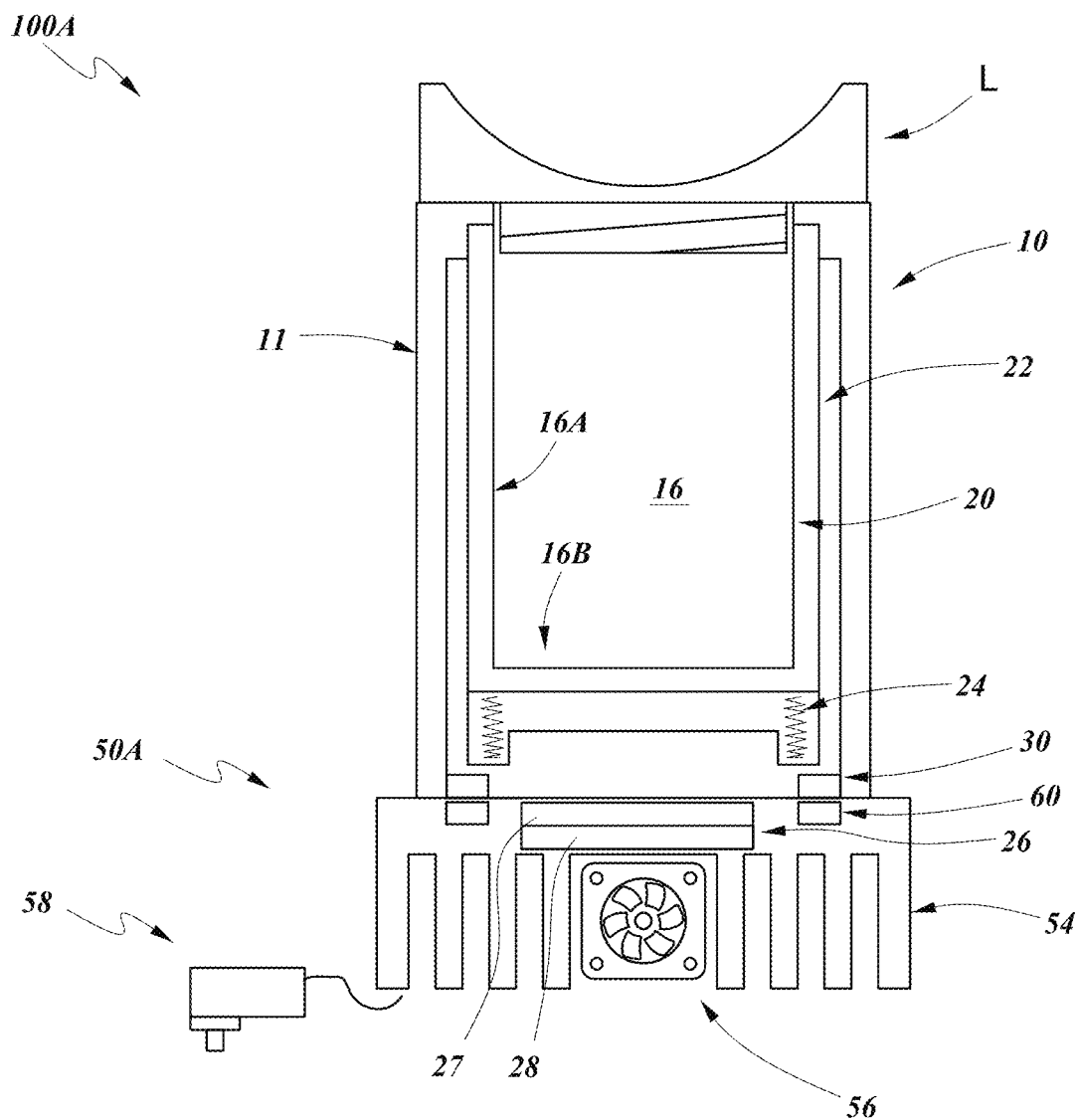
FIG. 4 is a schematic view of the actively cooled drinkware container of FIG. 3 in a different position.

FIGS. 3-4 schematically illustrate a drinkware container 100A and heat sink unit 50A. Some of the features of the drinkware container 100A and heat sink unit 50A are similar to features in the drinkware container 100 and heat sink unit 50 in FIGS. 1-2. Thus, references numerals used to designate the various components of the drinkware container 100 and heat sink unit 50 are identical to those used for identifying the corresponding components of the drinkware container 100A and heat sink unit 50A in FIGS. 3-4. Therefore, the structure and description for the various components of the drinkware container 100 and heat sink unit 50 in FIGS. 1-2 is understood to also apply to the corresponding components of the drinkware container 100A and heat sink unit 50A in FIGS. 3-4, except as described below.

The drinkware container 100A and heat sink unit 50A differ from the drinkware container 100 and heat sink unit 50 described above in that the one or more thermoelectric elements 26 are not housed in the drinkware container 100A (e.g., are not attached to the heat spreader 22). Rather, the one or more thermoelectric elements 26 are housed in (e.g., incorporated in or otherwise embedded in) the heat sink unit 50A. Optionally, the one or more thermoelectric elements 26 are arranged on the heat sink unit 50A so that their cold side 27 is generally aligned (e.g., coplanar) with the proximal surface 52 of the heat sink unit 50A. In this implementation, there are no electronics in the drinkware container 100A.

When the drinkware container 100A is placed on the heat sink unit 50A, for example so that the base 15 of the body 10 contacts the proximal surface 52, the one or more magnets 60 of the heat sink unit 50A exert an attraction force on the one or more magnets 30 of the heat spreader 22 that is greater than a spring force exerted by the one or more springs 24 on the heat spreader 22, causing the heat spreader 22 to move in the direction toward the heat sink unit 50A until the heat spreader 22 is proximate (e.g., in contact with) the base 15 (e.g. into the deployed position shown in FIG. 4). Power is optionally transmitted to the one or more thermoelectric elements 26 in the heat sink unit 50A (e.g., via the electrical connector 58) to operate the one or more thermoelectric elements 26.

With continued reference to FIG. 4, while in the deployed position, the hot side 28 of the one or more thermoelectric elements 26 are in thermal communication with other components (e.g., the fins 54) of the heat sink unit 50A. The one or more thermoelectric elements 26 operate to transfer heat from the cold side 27 to the hot side 28, and the heat from the hot side 28 is removed (or dissipated) by the heat sink unit 50 (e.g., by the one or more fins 54 of the heat sink unit 50). Optionally, the fan 56 is operated to facilitate removal of heat from the hot side 28, for example via the fins 54 heat sink unit 50. The cold side 27 of the one or more thermoelectric elements 26 is in thermal communication with the base 15 of the body 10, which in turn is in thermal communication with the heat spreader 22, which is in thermal communication with the PCM 20. Therefore, operation of the one or more thermoelectric elements 26 while the drinkware container 100A is on the heat sink unit 50A (e.g., with the lid L on the container body 10) causes their cold side 27 to cool the heat spreader 22, which in turn cools the PCM 20 (to solidify or charge the PCM 20).

Removal of the drinkware container 100A from the heat sink unit (e.g., power base) 50A, allows the spring force of the one or more springs 24 to retract the heat spreader 22 away from the base 15 (e.g., to define the gap 19 between the base 15 and the heat spreader 22). In implementations where the chamber 18 is under vacuum, retraction of the heat spreader to the retracted position (e.g., see FIG. 3) facilitates the insulation of the PCM 20 (e.g., thermal core) from the outer surface 11 and base 15 of the body 10 to inhibit loss of the PCM 20 charge through these surfaces. In other implementations, where the chamber 18 is not under vacuum, retraction of the heat spreader 22 would still facilitate insulation of the PCM 20, though not as efficiently as the implementation where the chamber 18 is under vacuum. Once the PCM 20 is charged (e.g., solidified), a liquid (e.g., water, juice, soft drink, iced tea) can be introduced into the chamber 16 and the PCM 20 can maintain the liquid in the chamber 16 in a cooled state for a prolonged period of time (e.g., 10 hours or less, 8 hours or less, 6 hours or less, 4 hours or less, 2 hours or less, about 1 hour etc.).

In another implementation, the heat spreader 22 is in a fixed position in thermal communication with the base 15 (e.g., so the gap 19 is closed) when the drinkware container 100A is disposed on the heat sink unit 50A as well as when it is removed from the heat sink unit 50A.

In another implementation, the heat sink unit 50, 50A is excluded and the PCM 20 of the drinkware container 100, 100A can be charged by placing the container 100, 100A in a freezer for a period of time (e.g., with the lid L removed from the container body 10). Once charged, the drinkware container 100, 100A can be removed from the freezer and a liquid poured into the chamber 16 to cool the liquid and maintain the liquid in a chilled state for a prolonged period of time.

Figure 5:
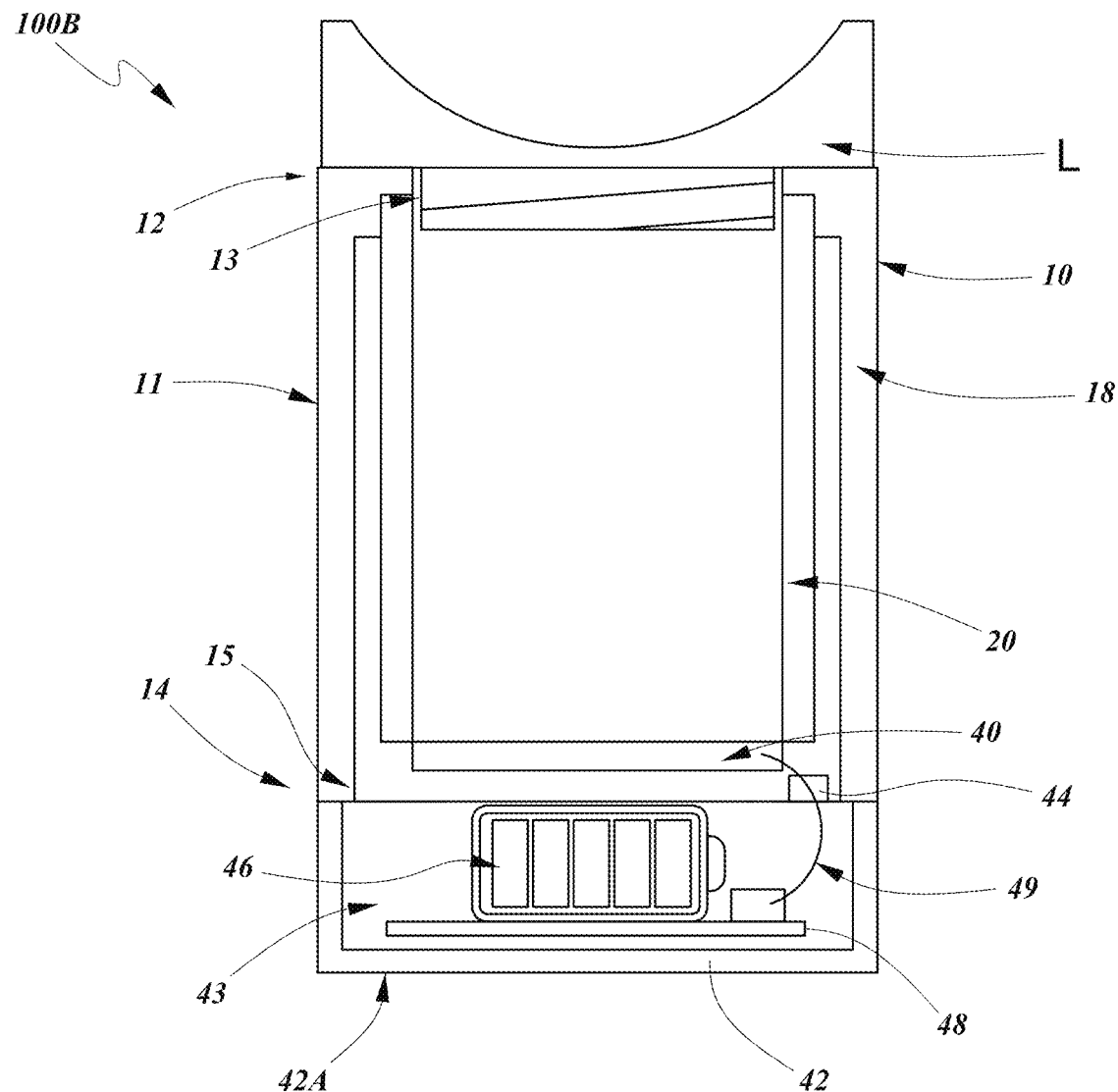
FIG. 5 is a schematic view of an actively heated drinkware container.

FIG. 5 schematically illustrates a drinkware container 100B. Some of the features of the drinkware container 100B are similar to features in the drinkware container 100, 100A in FIGS. 1-4. Thus, references numerals used to designate the various components of the drinkware container 100 are identical to those used for identifying the corresponding components of the drinkware container 100B in FIG. 5. Therefore, the structure and description for the various components of the drinkware container 100 in FIGS. 1-2 is understood to also apply to the corresponding components of the drinkware container 100B in FIG. 5, except as described below.

The drinkware container 100B is optionally an actively heated drinkware container operable to heat the contents of the container and/or maintain the contents of the container in a heated state. The drinkware container 100B has a body 10 with an outer wall 11 that extends between a proximal end 12 that has an opening 13 and a distal end 14 having a base 15. The opening 13 is selectively closed by a lid L removably attached to the proximal end 12. The body 10 has an inner wall 16A and a base wall 16B that defines an open chamber 16 that can receive and hold a liquid (e.g., water, tea, coffee, etc.) therein. Optionally, the body 10 can be made of metal (e.g., stainless steel). In another implementation, the body 10 can be made of plastic. In one implementation, the body 10 has a cavity 18 (e.g., annular cavity or chamber) between the inner wall 16A and the outer wall 11. Optionally, the cavity 18 can be under vacuum. In another implementation, the cavity 18 can be filled with air but not be under vacuum.

With continued reference to FIG. 5, a phase change material (PCM) 20 is disposed about the chamber 16. Optionally, the phase changer material 20 is a solid-to-solid PCM. In another implementation, the phase change material 20 is a solid-to-liquid PCM. Optionally, the phase change material 20 is disposed within a chamber circumferentially about the inner wall 16A. The PCM 20 can passively cool a heated liquid poured into the chamber 16.

The drinkware container 100B also has one or more heating elements 40 in thermal communication (e.g., in contact) with at least a portion of the chamber 16. In one implementation, the one or more heating elements 40 include a resistive heater, such as a heater flex (e.g., flexible film heater). For example, the one or more heating elements 40 can be in thermal communication (e.g., in contact) with at least a portion of the base wall 16B.

The drinkware container 100B optionally has a cap 42 disposed below the base 15 so as to define a cavity 43 between the base 15 and an end surface 42A of the cap 42. One or more power storage elements 46 (e.g., rechargeable batteries 46) and circuitry 48 can be housed in the cavity 43. The circuitry 48 can connect to the one or more heating elements 40 via one or more wires 49 that extend through one or more pass through connections 44 (e.g., vacuum tight pass through connections) in the base 15.

In operation, a hot liquid (e.g., coffee, tea, hot water) can be poured into the chamber 16, and the phase change material 20 will absorb heat from the liquid if the liquid temperature is above the transition temperature of the PCM 20, thereby reducing the temperature of the liquid. The one or more heating elements 40 are selectively operated to add heat to the liquid in the chamber 16 to increase the temperature of the liquid to a desired temperature or to maintain the temperature of the liquid at a desired temperature for a prolonged period of time. Advantageously, having the cavity 18 under vacuum allows the one or more heating elements 40 to heat the contents of the chamber 16 more efficiently, thereby consuming less power from the one or more power storage elements 46, which in turn allows a reduction in the size and/or number of power storage elements 46 needed for the operation of the drinkware container 100. Advantageously, the one or more power storage elements 46 need only supply 1-2 W-hr to operate the drinkware container 100 to heat liquid in the chamber 16 (e.g., with the lid L secured on the container body 10) and maintain the liquid at a generally constant temperature for an extended period of time (e.g., 8 hours or less, 6 hours or less, 4 hours or less, 2 hours or less, about 1 hour etc.).

Figure 6:
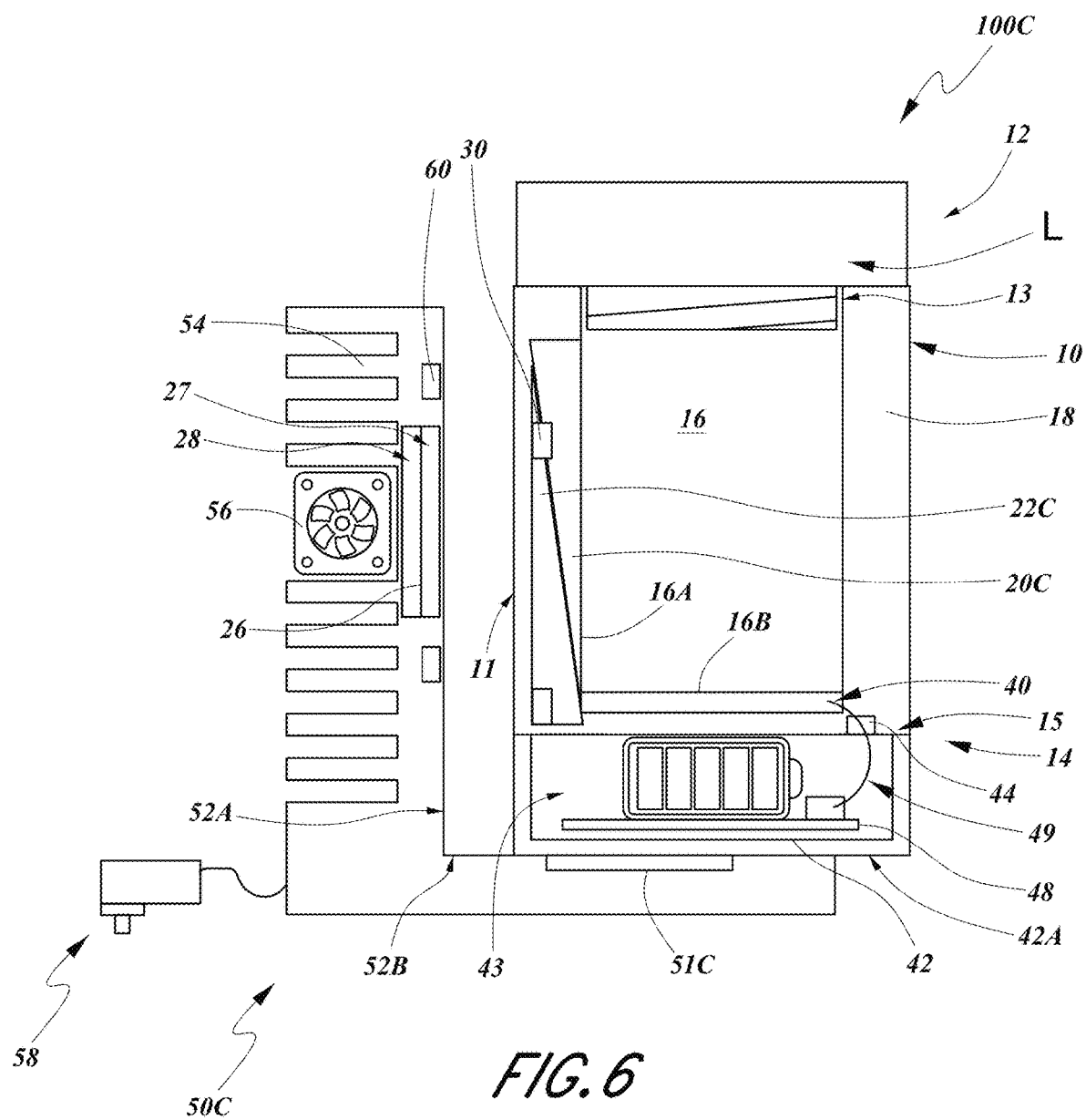
FIG. 6 is a schematic view of an actively heated or cooled drinkware container in one position.
Figure 7:
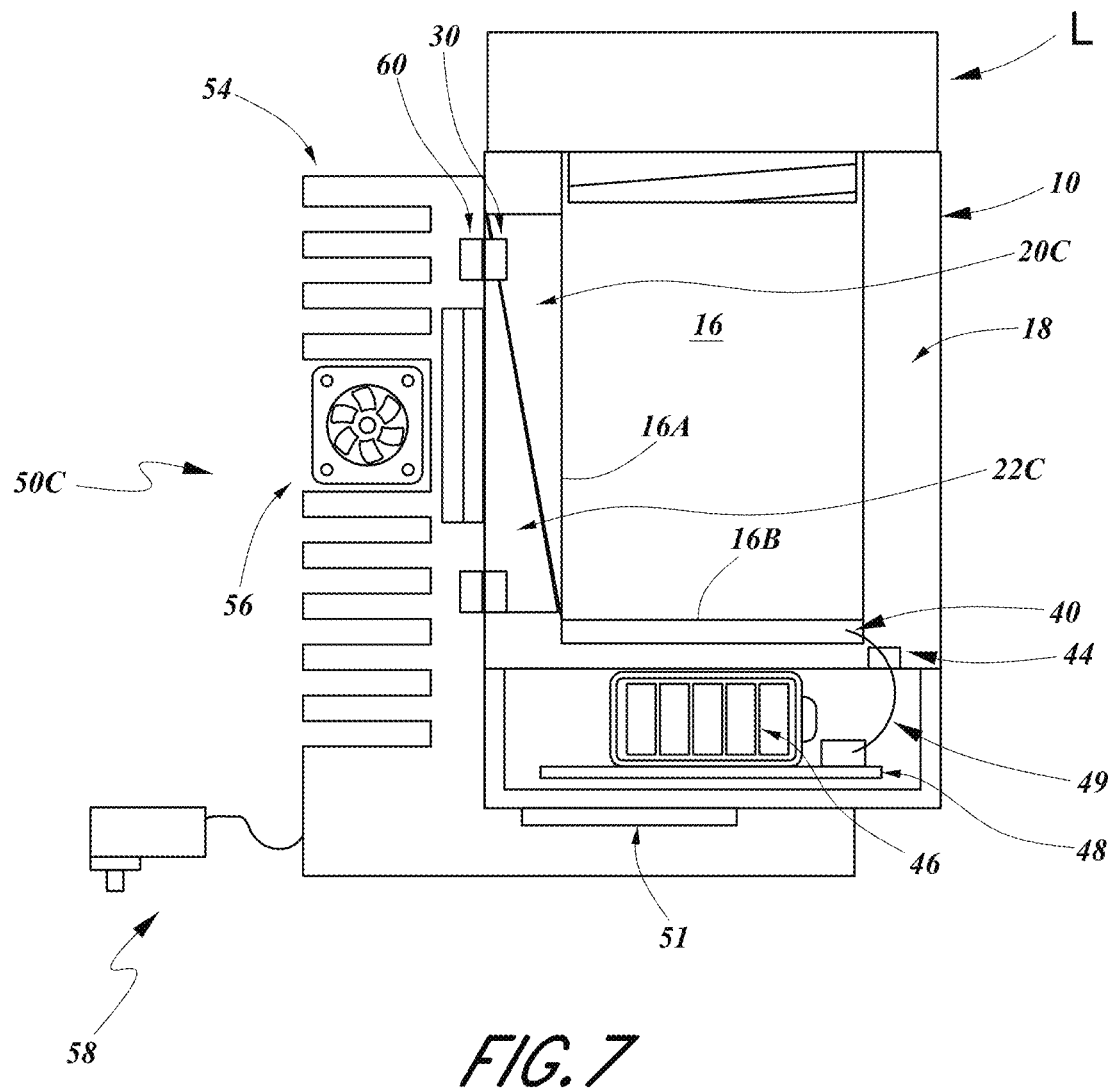
FIG. 7 is a schematic view of the actively heated or cooled drinkware container of FIG. 6 in a different position.

FIGS. 6-7 schematically illustrate a drinkware container 100C. Some of the features of the drinkware container 100C are similar to features in the drinkware container 100A in FIGS. 3-4 and drinkware container 100B in FIG. 5. Thus, references numerals used to designate the various components of the drinkware container 100A, 100B are identical to those used for identifying the corresponding components of the drinkware container 100C in FIGS. 6-7. Therefore, the structure and description for the various components of the drinkware container 100A in FIGS. 3-4 and drinkware container 100B in FIG. 5 is understood to also apply to the corresponding components of the drinkware container 100C in FIGS. 6-7, except as described below. The drinkware container 100C is optionally an actively cooled and actively heated drinkware container operable to cool or heat the contents of the container and/or maintain the contents of the container in a cooled state or a heated state for a prolonged period of time.

The drinkware container 100C has a body 10 with an outer wall 11 that extends between a proximal end 12 that has an opening 13 and a distal end 14 having a base 15. The opening 13 is selectively closed by a lid L removably attached to the proximal end 12. The body 10 has an inner wall 16A and a base wall 16B that defines an open chamber 16 that extends to the opening 13 and can receive and hold a liquid (e.g., water, iced tea, iced coffee, coffee, tea, etc.) therein. Optionally, the body 10 can be made of metal (e.g., stainless steel). In another implementation, the body 10 can be made of plastic. In one implementation, the body 10 has a cavity 18 (e.g., annular cavity or chamber) between the inner wall 16A and the outer wall 11. Optionally, the cavity 18 can be under vacuum. In another implementation, the cavity 18 can be filled with air but not be under vacuum.

A phase change material (PCM) 20 (e.g., thermal core) is disposed in the body 10 and in thermal communication with at least a portion of the chamber 16 (e.g., disposed about at least a portion of the chamber 16). Optionally, the phase changer material 20 is a solid-to-solid PCM. In another implementation, the phase change material 20 is a solid-to-liquid PCM. Optionally, the phase change material 20 is disposed within a chamber in thermal contact with at least a portion of the inner wall 16A (e.g., a chamber that extends bout at least a portion of a circumference of the inner wall 16A). The phase change material 20 optionally has a low temperature melting point (e.g., melting point less than 10 degrees C., less than 5 degrees C., etc.). For example, the phase change material 20 can have a melting point temperature of approximately 4 degrees Celsius (e.g., approximately 40 degrees Fahrenheit).

A heat conductor 22 is movably disposed in the body 10 relative to the phase change material (PCM) 20 and in thermal communication with the PCM 20. Optionally, the heat conductor 22 can be in direct contact with a chamber in which the PCM 20 is housed. In one implementation, the heat conductor 22 is made of metal. As further described below, the heat conductor 22 effects heat transfer with the PCM 20.

The heat conductor 22 optionally moves between a retracted position (see FIG. 6) where the heat conductor 22 is spaced from the outer wall 11 of the container body 10 so as to define a gap therebetween, and a deployed position (see FIG. 7), where the heat conductor 22 is in thermal communication (e.g., in direct contact) with the outer wall 11 of the container body 10. The heat conductor 22 can include one or more magnets 30 (e.g., embedded in the heat conductor 22), and movement of the heat conductor 22 between the retracted position (see FIG. 6) and the deployed position (see FIG. 7) is effected at least in part by the interaction between the magnets 30 and magnets 60 on a heat sink unit 50C, as further discussed below. In another implementation, the heat conductor 22 is instead fixed (i.e., not movably attached) relative to the PCM 20 (in the position shown in FIG. 7) so that the heat conductor 22 is in thermal communication (e.g., in direct contact) with the outer wall 11 of the container body 10.

The drinkware container 100C also has one or more heating elements 40 in thermal communication (e.g., in direct contact) with at least a portion of the chamber 16. In one implementation, the one or more heating elements 40 include a resistive heater, such as a heater flex (e.g., flexible film heater). For example, the one or more heating elements 40 can be in thermal communication (e.g., in contact) with at least a portion of the base wall 16B.

The drinkware container 100C optionally has a cap 42 disposed below the base 15 so as to define a cavity 43 between the base 15 and an end surface 42A of the cap 42. One or more optional power storage elements 46 (e.g., rechargeable batteries) and circuitry 48 are optionally housed in the cavity 43. The circuitry 48 can connect to the one or more heating elements 40 via one or more wires 49 that extend through one or more pass through connections 44 (e.g., vacuum tight pass through connections) in the base 15.

With continued reference to FIGS. 6-7, the drinkware container 100C can be removably attached to (e.g., disposed upon, supported on or in contact with) a heat sink unit 50C. The heat sink unit 50C can have a first surface 52A and a second contact surface 52B. Optionally, the first and second contact surfaces 52A, 52B can extend along different planes (e.g. can extend generally perpendicular to each other). In another implementation, the first and second contact surfaces 52A, 52B can extend along the same plane (e.g., can be part of the same surface). The heat sink unit 50C can optionally have one or more (e.g., a plurality of) fins 54. Optionally, the heat sink unit 50C has a fan 56. The heat sink unit 50C can optionally have a connector 58 (e.g., wall outlet connector) for connecting the heat sink unit 50C to a power source. In another implementation, the heat sink unit 50C can instead have one or more batteries (e.g., rechargeable batteries). Optionally, one or more magnets 60 are attached to or embedded in the heat sink unit 50C, for example attached to or embedded in the contact surface 52A of the heat sink unit 50C. In one implementation, the one or more magnets 60 are optionally permanent magnets. In another implementation, the one or more magnets 60 are optionally electromagnets whose polarity can be selectively controlled by a controller of the heat sink unit 50C (e.g., via user input via a user interface of the heat sink unit 50C or wirelessly via a mobile electronic device such as a smartphone) to allow selective coupling and decoupling of the drinkware container 100C to the heat sink unit 50C.

One or more thermoelectric elements 26 are housed in (e.g., incorporated in or otherwise embedded in) the heat sink unit 50C. Optionally, the one or more thermoelectric elements 26 are arranged on the heat sink unit 50C so that their cold side 27 is generally aligned (e.g., coplanar) with the contact surface 52A of the heat sink unit 50C and their hot side 28 faces away from the contact surface 52A and is in thermal communication (e.g., in contact) with at least one of the one or more fins 54 or with the fan 56.

Cooling Operation

When the drinkware container 100C is placed on the heat sink unit 50C, for example so that the outer wall 11 of the body 10 contacts the contact surface 52A, the one or more magnets 60 of the heat sink unit 50C exert an attraction force on the one or more magnets 30 of the heat conductor 22, causing the heat conductor 22 to move in the direction toward the heat sink unit 50A (e.g., toward the outer wall 11) until the heat conductor 22 is proximate (e.g., in contact with) the outer wall 11 (e.g. into the deployed position shown in FIG. 7). In such a deployed position, the heat conductor 22 is in thermal contact with the outer wall 11 of the container body 10 as well as with the PCM 20.

Power is optionally transmitted to the one or more thermoelectric elements 26 in the heat sink unit 50C (e.g., via the electrical connector 58) to operate the one or more thermoelectric elements 26. While the heat conductor 22 is in the deployed position (see FIG. 7), the hot side 28 of the one or more thermoelectric elements 26 are in thermal communication with other components (e.g., the fins 54, the fan 56) of the heat sink unit 50C. The one or more thermoelectric elements 26 operate to transfer heat from the cold side 27 to the hot side 28, and the heat from the hot side 28 is removed (or dissipated) by the heat sink unit 50C (e.g., by the one or more fins 54 of the heat sink unit 50C). Optionally, the fan 56 is operated to facilitate removal of heat from the hot side 28, for example via the fins 54 heat sink unit 50C. The cold side 27 of the one or more thermoelectric elements 26 is in thermal communication with the outer wall 11 of the body 10, which in turn is in thermal communication with the heat conductor 22, which is in thermal communication with the PCM 20. Therefore, operation of the one or more thermoelectric elements 26 while the drinkware container 100C is on the heat sink unit 50C (e.g., with the lid L on the container body 10) causes their cold side 27 to cool the heat conductor 22, which in turn cools the PCM 20 (to solidify or charge the PCM 20).

Removal of the drinkware container 100C from the heat sink unit (e.g., power base) 50C, allows the retraction of the heat conductor 22 away from the outer wall 11 (e.g., to define the gap 19 between the outer wall 11 and the heat conductor 22). For example, one or more springs in the container body 10 can be attached to the heat conductor 22 and can move the heat conductor 22 to the retracted position when the drinkware container 100C is removed (e.g., detached) from the heat sink unit 50C. In implementations where the chamber 18 is under vacuum, retraction of the heat conductor 22 to the retracted position (e.g., see FIG. 6) facilitates the insulation of the PCM 20 (e.g., thermal core) from the outer surface 11 and base 15 of the body 10 to inhibit loss of the PCM 20 charge through these surfaces. In other implementations, where the chamber 18 is not under vacuum, retraction of the heat conductor 22 would still facilitate insulation of the PCM 20, though not as efficiently as the implementation where the chamber 18 is under vacuum. Once the PCM 20 is charged (e.g., solidified), a liquid (e.g., water, juice, soft drink, iced tea, iced coffee) can be introduced into the chamber 16 and the PCM 20 can maintain the liquid in the chamber 16 in a cooled state for a prolonged period of time (e.g., 10 hours or less, 8 hours or less, 6 hours or less, 4 hours or less, 2 hours or less, about 1 hour etc.).

In another implementation, the heat conductor 22 is in a fixed position in thermal communication with the outer wall 11 (e.g., so there is no gap between the outer wall 11 and the heat conductor 22) when the drinkware container 100C is disposed on the heat sink unit 50C as well as when it is removed from the heat sink unit 50C.

Heating Operation

In operation, a hot liquid (e.g., coffee, tea, hot water) can be poured into the chamber 16, and the phase change material 20 will absorb heat from the liquid if the liquid temperature is above the transition temperature of the PCM 20, thereby reducing the temperature of liquid. The one or more heating elements 40 are selectively operated to add heat to the liquid in the chamber 16 to increase the temperature of the liquid to a desired temperature or to maintain the temperature of the liquid at a desired temperature for a prolonged period of time. Advantageously, having the cavity 18 under vacuum allows the one or more heating elements 40 to heat the contents of the chamber 16 more efficiently, thereby consuming less power from the one or more power storage elements 46, which in turn allows a reduction in the size and/or number of power storage elements 46 needed for the operation of the drinkware container 100. Advantageously, the one or more power storage elements 46 need only supply 1-2 W-hr to operate the drinkware container 100C to heat liquid in the chamber 16 (e.g., with the lid L secured on the container body 10) and maintain the liquid at a generally constant temperature for an extended period of time (e.g., 8 hours or less, 6 hours or less, 4 hours or less, 2 hours or less, about 1 hour etc.).

Optionally, the heat sink unit 50C can be a charging unit or power base and include one or more charging elements (e.g. electrical contacts, wireless power transmitter) 51 that can transmit power to the one or more power storage elements 46 of the drinkware container 100C (e.g., via electrical contacts of the drinkware container 100C that contact electrical contacts in the heat sink unit 50C, via a wireless power receiver, for example mounted on the circuitry 48, operable to receive power from a wireless power transmitter in the heat sink unit 50C).

Figure 8:
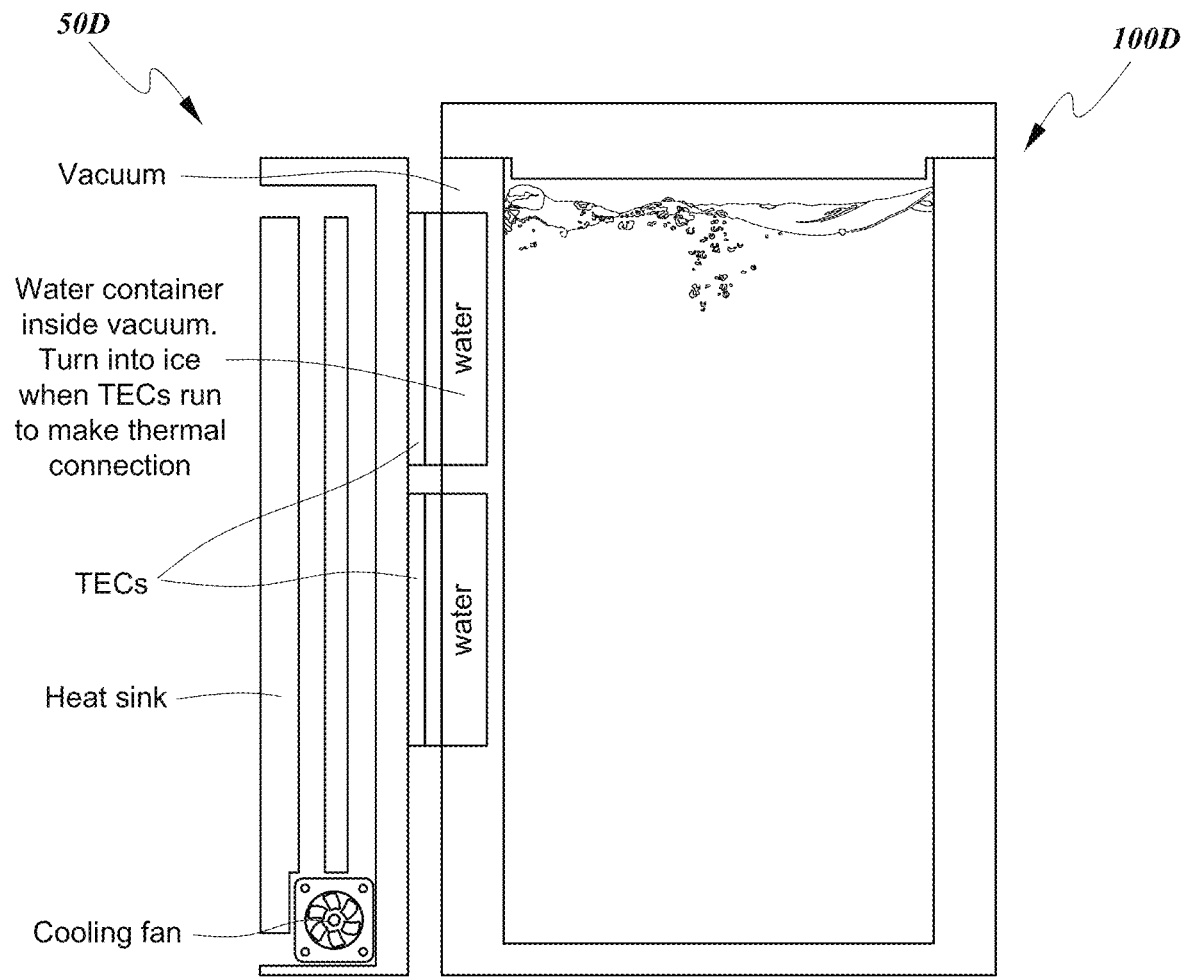
FIG. 8 is a schematic view of an actively heated or cooled drinkware container in one mode of operation.
Figure 9:
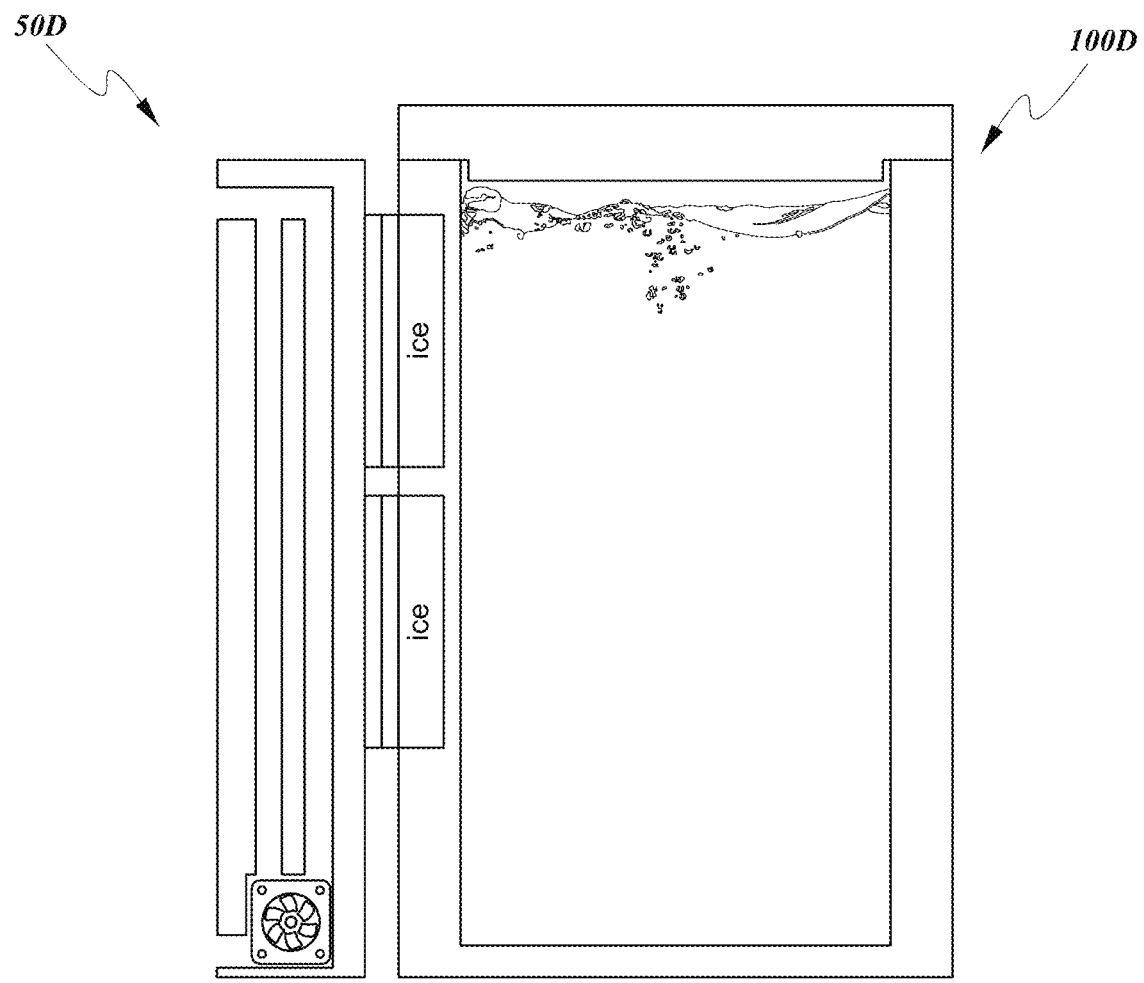
FIG. 9 is a schematic view of the actively heated or cooled drinkware container in another mode of operation.

FIGS. 8-9 schematically illustrate a drinkware container 100D. Some of the features of the drinkware container 100D are similar to features in the drinkware container 100A-100C described above and shown in FIGS. 1-7. Thus, references numerals used to designate the various components of the drinkware container 100A-100C are identical to those used for identifying the corresponding components of the drinkware container 100D in FIGS. 8-9. Therefore, the structure and description for the various components of the drinkware containers 100A-100C in FIGS. 1-7 is understood to also apply to the corresponding components of the drinkware container 100D in FIGS. 8-9, except as described below. The drinkware container 100D is optionally an actively cooled drinkware container operable to cool the contents of the container and/or maintain the contents of the container in a cooled state for a prolonged period of time.

The drinkware container 100D has a chamber that can be filled with a liquid through a top opening of the container. The top opening can be sealed with a lid. The container 100D can optionally be vacuum sealed. For example, the container 100D can have an outer wall spaced radially outward from the inner wall of the container 100D that defines the chamber, so as to define an annular gap between the outer wall and the inner wall. The annular gap can be under vacuum. The container 100D can have one or more pockets, cells or chambers (e.g., expandable pockets, cells or chambers) filled with a liquid (e.g., water) that are proximate (e.g., adjacent, in contact with) an inner surface of the outer wall of the container 100D, so that the one or more pockets, cells or chambers are disposed in the annular gap between the outer surface and inner surface.

A heat sink unit 50D can include one or more fins and a cooling fan operable to facilitate drawing of heat by the heat sink unit 50D from the drinkware container 100D when the drinkware container 100D is attached to (e.g., disposed on, coupled to) the heat sink unit 50D. the heat sink unit 50D can have one or more thermoelectric elements (e.g., Peltier Elements) with a cold side that faces toward the drinkware container 100D and a hot side that faces away from the drinkware container 100D when the drinkware container 100D is attached to the heat sink unit 50D. Though not shown, the heat sink unit 50D can have a power source (e.g., a wall connector, such as connector 58 in FIG. 4).

In operation, when the drinkware container 100D is detached from the heat sink unit 50, the one or more pockets, cells or chambers (e.g., expandable pockets, cells or chambers) filled with the liquid (e.g., water) can be spaced from (e.g., not in thermal contact with, not in contact with) an outer surface of the inner wall so that the inner wall is insulated from the outer wall by the annular gap under vacuum, which allows the liquid in the chamber of the container 100D to maintain its chilled state for a longer period of time (particularly when the opening of the chamber is sealed by the lid).

As shown in FIG. 9, when the drinkware container 100D is attached to (e.g., disposed on, coupled to, in operative contact with) the heat sink unit 50D, the heat sink unit 50D can be operated to draw heat from the drinkware container 100D. Optionally, the one or more thermoelectric elements (TECs) are operable (e.g., via a control system of the heat sink unit 50D) so that the hot side of the TECs transfer heat to one or more fins of the heat sink unit 50D or the fan is operated to dissipate the heat from the TECs. The cold side of the TECs is in thermal contact (e.g., in direct contact with, operative contact with) the outer wall, and therefore in operative contact with the one or more cells, pockets or chambers filled with the liquid (e.g., water). The cold side of the TECs operate to freeze the liquid, which causes it to expand in the one or more cells, pockets or chambers. Optionally, the one or more cells, pockets or chambers expand due to the freezing of the liquid so that they contact (e.g., operatively contact, directly contact) an outer surface of the inner wall, thereby effecting heat transfer between the chamber of the drinkware container 100D that holds liquid and the heat sink unit 50D. Accordingly, the heat sink unit 50D is thereby able to draw heat from the liquid in the chamber of the drinkware container 100D to chill said liquid. Once the drinkware container 100D is detached from (e.g., lifted off of, decoupled from) the heat sink unit 50D, the frozen liquid in the one or more cells, pockets or chambers melt after a period of time to again insulate the inner wall from the outer wall of the container 100D as shown in FIG. 8.

Additional Embodiments

In embodiments of the present invention, a container system may be in accordance with any of the following clauses:

Clause 1. A container system, comprising:
a container body that extends between a proximal end and a bottom wall at a distal end, the container body having an outer wall and an inner wall spaced inward of the outer wall to define a cavity therebetween, the inner wall extending between an opening at a proximal end of the container body and a base wall, the inner wall and base wall defining a chamber, the bottom wall spaced below the base wall;
a phase change material disposed in the cavity and in thermal communication with at least a portion of the chamber, the phase change material spaced apart from the outer wall; and
a thermal conductor housed in the cavity and configured to move between a retracted position proximate the base wall where a gap is defined between the thermal conductor and the bottom wall, and a deployed position proximate the bottom wall where the thermal conductor is in thermal communication with the bottom wall, the thermal conductor having one or more walls disposed in thermal communication with the phase change material and disposed between the phase change material and the outer wall.

Clause 2. The container system of clause 1, wherein the cavity is under vacuum.

Clause 3. The container system of any preceding clause, further comprising one or more springs disposed between the thermal conductor and the base wall, the one or more springs configured to bias the thermal conductor toward the retracted position.

Clause 4. The container system of any preceding clause, wherein the thermal conductor is configured to move axially between the retracted and deployed positions along a central axis of the container body.

Clause 5. The container system of any preceding clause, further comprising one or more magnets attached to the thermal conductor.

Clause 6. The container system of any preceding clause, further comprising one or more thermoelectric elements attached to the thermal conductor and having a first side that faces toward the base wall and a second side that faces toward the bottom wall, where in the retracted position the second side is spaced apart from the bottom wall by the gap and in the deployed position the second side is in thermal communication with the bottom wall.

Clause 7. The container system of any preceding clause, further comprising a heat sink unit comprising a support surface configured to receive at least a portion of the bottom wall thereon, the heat sink unit having one or both of a fan and one or more fins configured to dissipate heat from the container body when body is disposed adjacent the surface of the heat sink unit.

Clause 8. The container system of clause 7, wherein the heat sink unit has one or more magnets configured to exert an attraction force on at least a portion of the thermal conductor so that when the container body is placed on the heat sink unit the one or more magnets draw the thermal conductor into the deployed position, and wherein the container body is removed from the heat sink unit the thermal conductor moves into the retracted position.

Clause 9. The container system of clause 8, wherein the thermal conductor comprises one or more magnets, the one or more magnets of the heat sink unit configured to exert the attraction force on the one or magnets of the thermal conductor when the container body is placed on the heat sink unit.

Clause 10. The container system of clause 9, wherein in the deployed position the heat sink unit is in thermal communication with the thermal conductor, the heat sink unit configured to draw heat from the thermal conductor, which in turn draws heat from the phase change material to solidify or charge the phase change material.

Clause 11. The container system of clause 10, wherein the heat sink unit further comprises one or more thermoelectric elements having a first side that faces along a same direction as the support surface of the heat sink unit and a second side that faces away from the support surface of the heat sink unit.

Clause 12. A container system, comprising:
a container body that extends between a proximal end and a bottom wall, the container body having an outer wall and an inner wall spaced inward of the outer wall to define a cavity therebetween, the inner wall extending between an opening at a proximal end of the container body and a base wall, the inner wall and base wall defining a chamber, the bottom wall spaced below the base wall;

a phase change material disposed in the cavity and in thermal communication with at least a portion of the chamber, the phase change material spaced apart from the outer wall;

one or more heating elements housed in the cavity and in thermal communication with at least a portion of the chamber; and a cap attached to the container body and defining a cavity between the bottom wall and a base of the cap, the cap housing one or more power storage elements and control circuitry, the control circuitry configured to control the operation of the one or more heating elements to heat the chamber to a preselected temperature setpoint, wherein the phase change material is configured to absorb heat from the chamber, and wherein the one or more heating elements is configured to add heat to the chamber to increase or maintain a temperature of the chamber.

Clause 13. The container system of clause 12, wherein the cavity is under a vacuum.

Clause 14. The container system of clause 13, wherein the circuitry is electrically connected to the one or more heating elements via one or more vacuum tight pass through connections that allow one or more wires to pass between the circuitry and the one or more heating elements.

Clause 15. A container system, comprising:

a container body that extends between a proximal end and a bottom wall, the container body having an outer wall and an inner wall spaced inward of the outer wall to define a cavity therebetween, the inner wall extending between an opening at a proximal end of the container body and a base wall, the inner wall and base wall defining a chamber, the bottom wall spaced below the base wall;

a phase change material disposed in the cavity and in thermal communication with at least a portion of the chamber, the phase change material spaced apart from the outer wall;

a thermal conductor housed in the cavity and configured to move between a retracted position spaced from the outer wall so that a gap is defined between the thermal conductor and the outer wall, and a deployed position proximate the outer wall where the thermal conductor is in thermal communication with the outer wall, the thermal conductor being in thermal communication with the phase change material and between the phase change material and the outer wall;

one or more heating elements housed in the cavity and in thermal communication with at least a portion of the chamber; and a cap attached to the container body and defining a cavity between the bottom wall and a base of the cap, the cap housing one or more power storage elements and control circuitry, the control circuitry configured to control the operation of the one or more heating elements to heat the chamber to a preselected temperature setpoint.

Clause 16. The container system of clause 15, wherein the cavity is under vacuum.

Clause 17. The container system of clause 15 or 16, wherein the thermal conductor is configured to move axially between the retracted and deployed positions.

Clause 18. The container system of any of clauses 15-17, further comprising one or more magnets attached to the thermal conductor.

Clause 19. The container system of any of clauses 15-18, further comprising a heat sink unit comprising a surface configured to receive at least a portion of the outer wall thereon, the heat sink unit having one or both of a fan and one or more fins configured to dissipate heat from the container body when body is disposed adjacent the surface of the heat sink unit.

Clause 20. The container system of clause 19, wherein the heat sink unit has one or more magnets configured to exert an attraction force on the one or more magnets attached to the thermal conductor so that when the container body is placed adjacent the heat sink unit the one or more magnets in the heat sink unit draw the thermal conductor into the deployed position, and wherein the container body is removed from the heat sink unit the thermal conductor moves into the retracted position.

Clause 21. The container system of clause 19, wherein the heat sink unit further comprises one or more thermoelectric elements having a cold side that faces along a same direction as the support surface of the heat sink unit and a hot side that faces away from the support surface of the heat sink unit.

Clause 22. The container system of clause 19, wherein in the deployed position the heat sink unit is in thermal communication with the thermal conductor, the heat sink unit configured to draw heat from the thermal conductor, which in turn draws heat from the phase change material to solidify or charge the phase change material.

Clause 23. The container system of clause 22, wherein the charged phase change material is configured to absorb heat from the chamber to maintain the chamber in a chilled state for a prolonged period of time.

Clause 24. The container system of clause 15, wherein the one or more heating elements are operable to add heat to the chamber to increase or maintain a temperature of the chamber.

Clause 25. A container system, comprising:

a container body that extends between a proximal end and a bottom wall at a distal end, the container body having an outer wall and an inner wall spaced inward of the outer wall to define a cavity therebetween, the inner wall extending between an opening at a proximal end of the container body and a base wall, the inner wall and base wall defining a chamber, the bottom wall spaced below the base wall;

a phase change material disposed in a flexible compartment within the cavity and in thermal communication with at least a portion of one or both of the outer wall and the bottom wall, the phase change material configured to move between a first state where the flexible compartment is in a retracted position spaced apart from one or both of the inner wall and the base wall and a second state where the flexible compartment is in an expanded position in thermal communication with one or both of the inner wall and base wall to effect heat transfer between the chamber and the phase change material.

Clause 26. The container system of clause 25, wherein the cavity is under vacuum.

Clause 27. The container system of clause 25, wherein the phase change material comprises water.

Clause 28. The container system of clause 25, further comprising a heat sink unit configured to removably contact the container body, the heat sink unit having one or both of a fan and one or more fins configured to dissipate heat from the container body when the container body is in thermal contact with the heat sink unit, the heat sink unit further comprising one or more thermoelectric elements having a first side that faces toward the container body and a second side that faces away from the container body when the container body is adjacent the heat sink such that the one or more thermoelectric elements are actuatable to draw heat away from the one or more flexible compartments to cool the phase change material, causing it to expand so that the one or more flexible compartments contact the inner wall and draw heat from the chamber to cool the chamber, said drawn heat dissipated by one or both of the fan and one or more fins of the heat sink.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are described in connection with containers such as drinkware containers, the features are applicable to containers that are not drinkware containers (e.g., dishware, such as plates and bowls, serverware such as serving dishes and hot plates, food storage containers such as tortilla warmers, bread baskets), medicine containers (e.g., portable medicine coolers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel"

refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A container system, comprising:
    a container body that extends between a proximal end and a bottom wall at a distal end, the container body having an outer wall and an inner wall spaced inward of the outer wall to define a cavity therebetween, the inner wall extending between an opening at a proximal end of the container body and a base wall, the inner wall and base wall defining a chamber, the bottom wall spaced below the base wall;
    a phase change material disposed in the cavity and in thermal communication with at least a portion of the chamber, the phase change material spaced apart from the outer wall; and
    a thermal conductor housed in the cavity and configured to move between a retracted position proximate the base wall where a gap is defined between the thermal conductor and the bottom wall, and a deployed position proximate the bottom wall where the thermal conductor is in thermal communication with the bottom wall, the thermal conductor having one or more walls disposed in thermal communication with the phase change material and disposed between the phase change material and the outer wall.

2. The container system of claim 1, wherein the cavity is under vacuum.

3. The container system of claim 1, further comprising one or more springs disposed between the thermal conductor and the base wall, the one or more springs configured to bias the thermal conductor toward the retracted position.

4. The container system of claim 1, wherein the thermal conductor is configured to move axially between the retracted and deployed positions along a central axis of the container body.

5. The container system of claim 1, further comprising one or more magnets attached to the thermal conductor.

6. The container system of claim 1, further comprising one or more thermoelectric elements attached to the thermal conductor and having a first side that faces toward the base wall and a second side that faces toward the bottom wall, where in the retracted position the second side is spaced apart from the bottom wall by the gap and in the deployed position the second side is in thermal communication with the bottom wall.

7. The container system of claim 1, further comprising a heat sink unit comprising a support surface configured to receive at least a portion of the bottom wall thereon, the heat sink unit having one or both of a fan and one or more fins configured to dissipate heat from the container body when body is disposed adjacent the surface of the heat sink unit.

8. The container system of claim 7, wherein the heat sink unit has one or more magnets configured to exert an attraction force on at least a portion of the thermal conductor so that when the container body is placed on the heat sink unit the one or more magnets draw the thermal conductor into the deployed position, and wherein the container body is removed from the heat sink unit the thermal conductor moves into the retracted position.

9. The container system of claim 8, wherein the thermal conductor comprises one or more magnets, the one or more magnets of the heat sink unit configured to exert the attraction force on the one or magnets of the thermal conductor when the container body is placed on the heat sink unit.

10. The container system of claim 9, wherein in the deployed position the heat sink unit is in thermal communication with the thermal conductor, the heat sink unit configured to draw heat from the thermal conductor, which in turn draws heat from the phase change material to solidify or charge the phase change material.

11. The container system of claim 10, wherein the heat sink unit further comprises one or more thermoelectric elements having a first side that faces along a same direction as the support surface of the heat sink unit and a second side that faces away from the support surface of the heat sink unit.

* * * * *

UNITED STATES PATENT AND TRADEMARK OFFICE
CERTIFICATE OF CORRECTION

PATENT NO. : 11,529,021 B2  
APPLICATION NO. : 16/962014  
DATED : December 20, 2022  
INVENTOR(S) : Clayton Alexander et al.

It is certified that error appears in the above-identified patent and that said Letters Patent is hereby corrected as shown below:

In the Specification

On Column 7, Line 33: Delete "hour" and insert -- hour, --.

On Column 8, Line 58: Delete "hour" and insert -- hour, --.

On Column 11, Line 51: Delete "hour" and insert -- hour, --.

On Column 12, Line 14: Delete "hour" and insert -- hour, --.

Signed and Sealed this  
Twenty-eighth Day of March, 2023

Katherine Kelly Vidal  
*Director of the United States Patent and Trademark Office*